Jan. 16, 1968
T. M. WALTERS
3,363,771
LIQUID FILTER
Filed Aug. 3, 1966
4 Sheets-Sheet 1
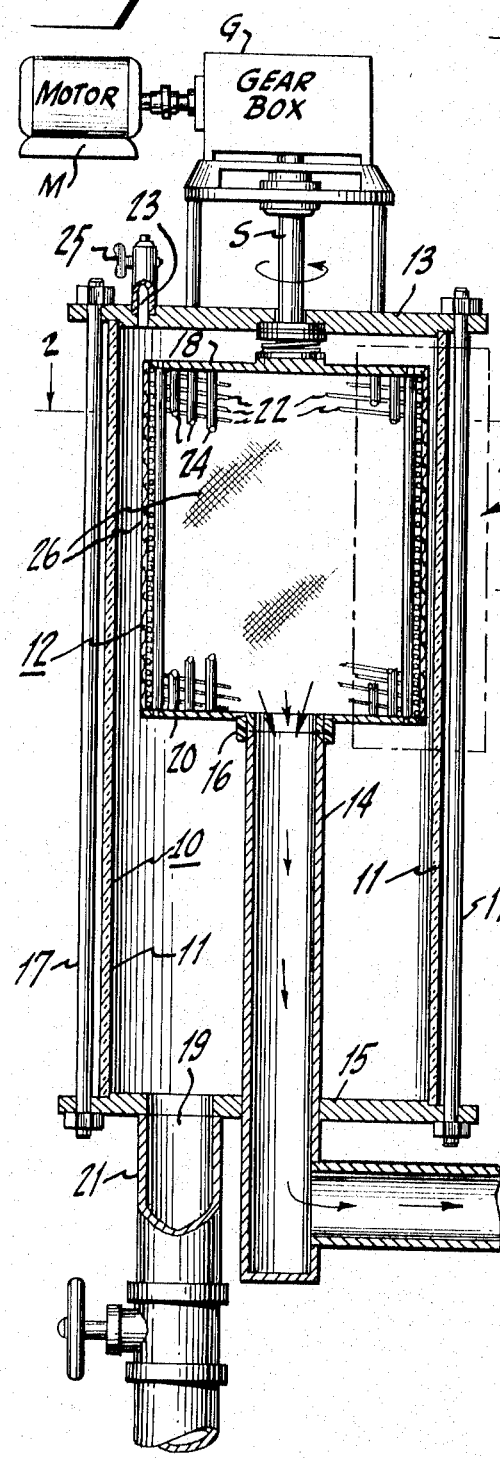
Fig.1.
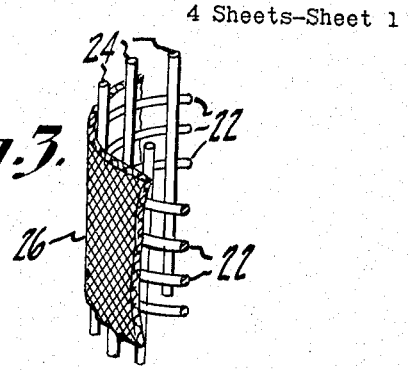
Fig.3.
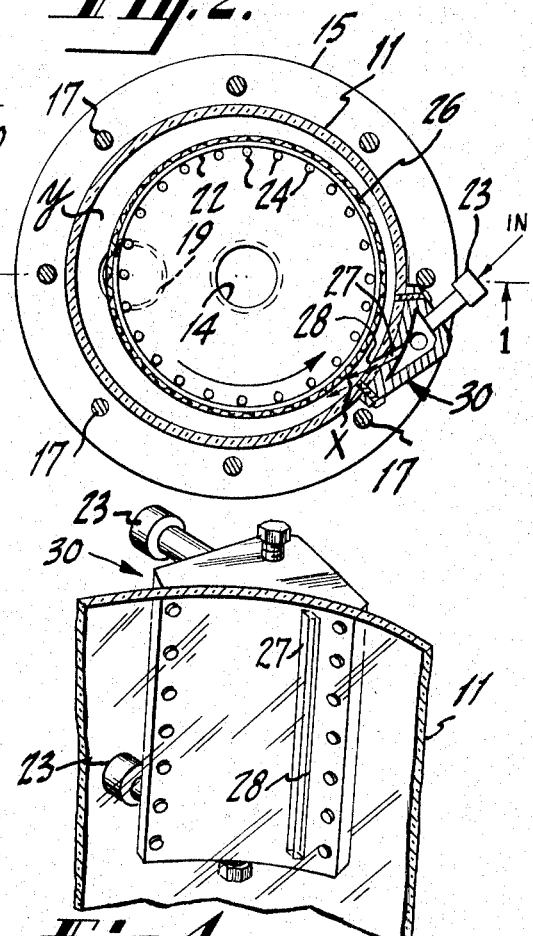
Fig.2.
Fig.4.
INVENTOR.
THEODORE M. WALTERS
BY
Charles H. Brown
attorney Jan. 16, 1968  T. M. WALTERS  3,363,771
LIQUID FILTER
Filed Aug. 3, 1966  4 Sheets-Sheet 2
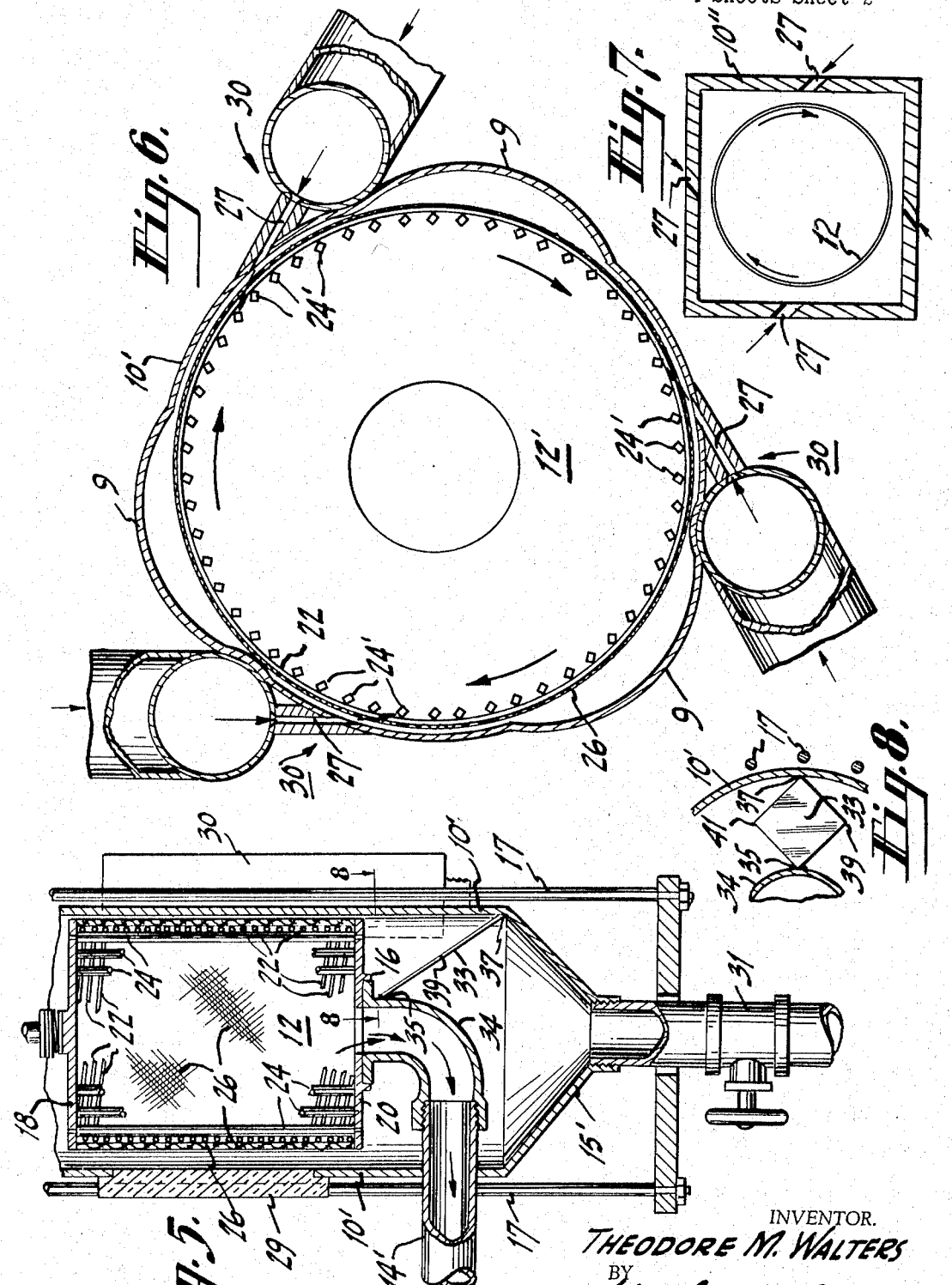
INVENTOR.
THEODORE M. WALTERS
BY Charles H. Brown
ATTORNEY

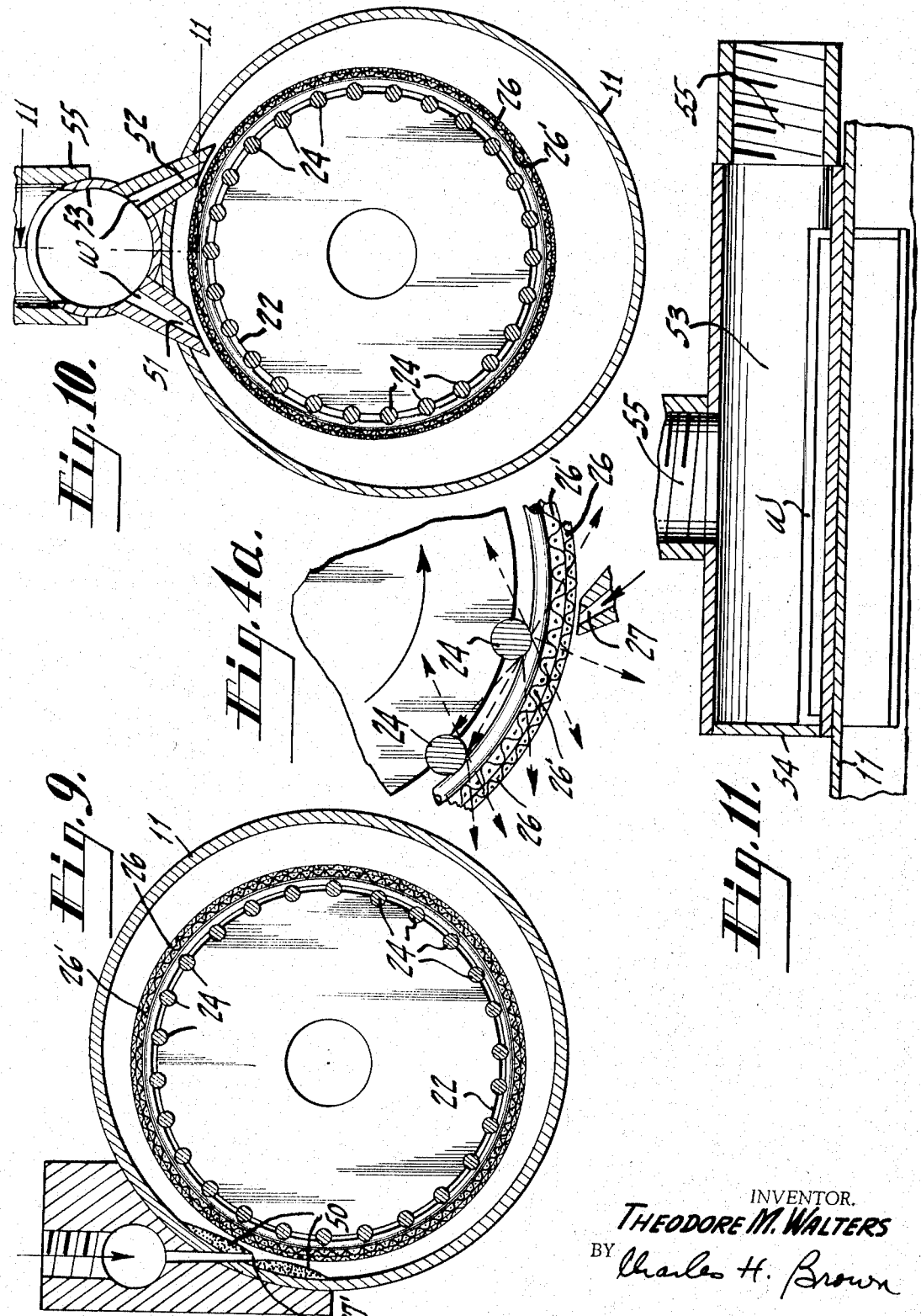

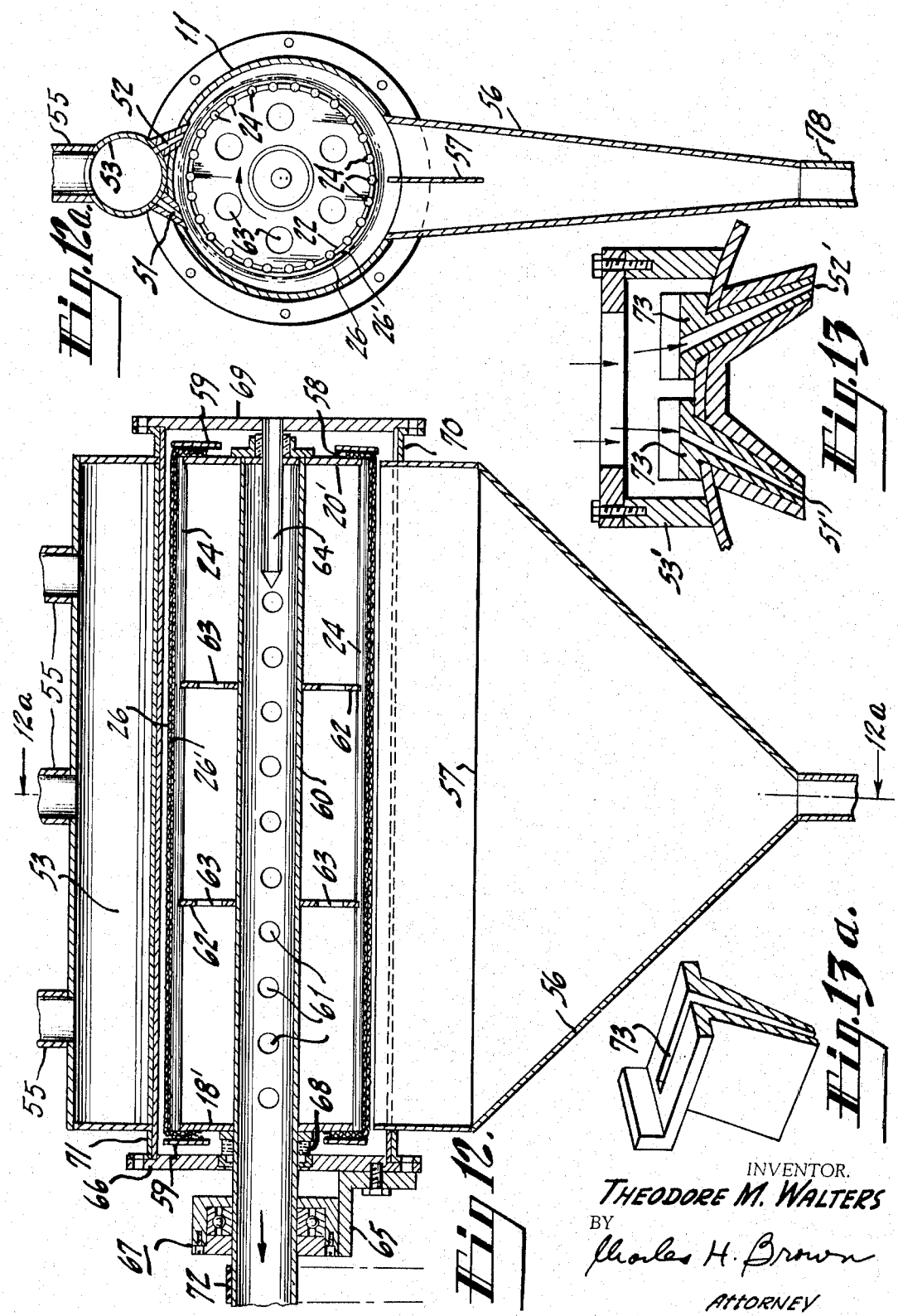

United States Patent Office 3,363,771
Patented Jan. 16, 1968

3,363,771
LIQUID FILTER
Theodore M. Walters, Milford, N.J., assignor of twenty-five percent to Charles H. Brown, Princeton, N.J.
Continuation-in-part of applications Ser. No. 411,233, Nov. 16, 1964, and Ser. No. 461,578, May 20, 1965. This application Aug. 3, 1966, Ser. No. 575,483
16 Claims. (Cl. 210—360)

ABSTRACT OF THE DISCLOSURE

A liquid filter comprising a rotor having a screen as a side wall, means in the interior of said rotor for directing a backflow of liquid outwardly toward said screen for cleansing said screen, and at least one elongated inlet in closely spaced relationship to said screen surface at an angle thereto for introducing the liquid to be filtered under pressure as a concentrated stream for impingement against the screen.

---

The present invention is a continuation-in-part of applications Ser. No. 461,578 filed May 20, 1965, and Ser. No. 411,233 filed Nov. 16, 1964, both now abandoned, and relates to rotary type filters for straining dirt and other undesirable solid matter, such as fibers, from a flowing fluid, such as a liquid or slurry, and particularly concerns a highly novel self-cleaning rotary filter which is useful for many purposes, such as, by way of example, for separating the pulp fibers from a liquid, or for delivering clean filtered liquids as water for drinking or to a swimming pool, or for recovering and re-using liquids from which solid particles have been removed.

An object of the invention is to provide an improved liquid filter of the rotary type.

Another object of the invention is to provide an improved, highly effective self-cleaning liquid filter which is of relatively light weight, is small in size, and has a relatively high capacity to deliver filtered liquid.

Still another object is to provide a self-cleaning filter of the rotary type which automatically operates to clean its screen as the screen rotates, useful for use with liquids and slurries in pulp mills and elsewhere.

In general, the filter of the invention comprises a stationary outer casing or housing containing therein a rotatable inner cylinder or chamber provided with a screen around the periphery thereof. The outer casing is provided with an opening to permit the incoming fluid, such as a liquid or slurry, to pass therethrough under pressure for impingment in a concentrated narrow relatively elongated stream against the screen mesh of the inner cylinder. A nozzle in the form of a slot is provided to cause the incoming fluid under pressure to be highly concentrated by virtue of the close spacing of the slot to the screen and the construction thereof in a manner to be described hereinafter. The length of the slot extends over the major portion of the length of the screen and, preferably is substantially coextensive with the effective length of the screen on the rotatable inner cylinder. This rotatable inner screen cylinder is constructed to have a plurality of longitudinally positioned liquid deflecting rods spaced from one another and positioned circumferentially relative to and spaced from the screen, there being a plurality of such rods for each quadrant of the circumference of the screen. The screen, in the preferred embodiment of the invention, is thus the outermost element of the rotatable cylinder. The incoming liquid under pressure passes directly through the screen and impinges on the rods as the inner cylinder rotates, as a result of which much of the liquid impinging on the rods is deflected and passes back through the screen, thereby dislodging any solid particles such as dirt, fibers, or debris tending to cling to the screen in or at the locations of the holes in the screen. A highly efficient self-cleaning action of the screen is effected, particularly so in one embodiment when the inner cylinder is rotated in a direction opposite to or against the flow of the liquid emerging under pressure from the inlet slot, although the invention, in its broadest aspect, is not limited to any particular direction of travel of the inner cylinder relative to the direction of flow of the incoming liquid.

In one embodiment of the invention, eccentric or off-center positioning of the inner rotatable cylinder relative to the outer stationary housing or casing provides a space between the inner cylinder and the outer housing at the region of point of entry of the narrow stream of liquid to be filtered, through an opening in the outer housing, which is smaller than the space between the inner cylinder and outer casing at other regions.

In another embodiment of the invention, the inner rotatable cylinder or chamber is concentrically disposed within and spaced from the outer housing with the inlet slot opening positioned in the interior of the outer housing at a location where the distance between the slot and screen of the inner rotatable cylinder is substantially smaller than the distance between the screen and outer casing at other locations.

According to still another embodiment of the invention, the rotatable inner screen carrying cylinder is concentrically disposed within and spaced from the outer housing or casing, but the outer housing is so constructed that wall portions thereof at regions at which the incoming liquid is introduced therein are closer to the outer periphery of the inner cylinder than other wall positions of the housing. Thus, the outer housing or casing may be in the form of a symmetrically irregular circle in cross-section, somewhat approaching the shape of a clover leaf, or a closed housing having flat or planar sides, such as square or triangular in cross-section. With such a construction, there is obtained a venturi effect adjacent the location or locations at which the liquid is introduced through the wall of the outer casing.

According to still another and preferred filter embodiment of the invention, there is provided a novel dual inlet construction having two elongated slots arranged at an acute angle to each other and at an acute angle to the screen and so positioned relative to the inner rotatable cylinder that the space between the screen on the inner cylinder and each slot of the dual inlet construction is smaller than the space between the screen and the outer casing at other locations removed from the dual inlet construction. With such a dual slot arrangement, regardless of the direction of rotation of the inner cylinder, the cleaning action on the screen of the inner cylinder is more highly effective to filter out relatively minute fibers or solid particles from the incoming liquid than other embodiments of the invention utilizing single slot inlet constructions.

An important feature of the invention is the use of a plurality of substantially uniformly spaced liquid deflecting rods around the rotatable inner cylinder and positioned near the screen, each rod being round or having a flat surface oriented to efficiently deflect the liquid impinging thereon, after the liquid has passed through the screen, back toward the screen for cleaning the screen of solid particles or debris which may tend to collect on the screen. There should be a plurality and preferably at least several such rods for each quadrant of the circumference of the screen. If there are too few and relatively too widely spaced deflecting rods for each quadrant of the circle defining the circumference of the screen, the effectiveness of the filter will suffer, while if there are too many and very closely spaced deflecting rods, the incoming liquid will have difficulty in passing through the spaces between the rods and, thus, the effectiveness of the filter will also suffer.

Another feature of the invention is the liquid inlet construction which provides a slot having a length substantially as long as the effective length of the screen on the inner rotatable cylinder, and wherein the distance between the slot and screen is substantially smaller than the distance between the screen and outer casing at the same and/or other locations. The slot thus provides a concentrated narrow relatively elongated stream of liquid under pressure which impinges against the screen.

Still another feature of the invention is the multi-feed construction in which a plurality of inlet slots introduce into the interior of the outer casing through the sidewall thereof the liquid to be filtered, at locations where the space between the inner rotatable cylinder or chamber and the outer stationary casing is smaller than the spaces between these same two elements at the other locations. Such multi-feed arrangement increases the capacity of the self-cleaning liquid filter of the invention without the need for increasing the size or bulk of the filter as compared to a single liquid inlet or feed.

Still another feature of the invention is a dual slot or nozzle inlet positioned close to the rotatable inner chamber in which one slot directs the liquid to be filtered against the screen at an acute angle thereto in a direction against the direction of rotation of the inner chamber while the other slot directs the liquid to be filtered against the screen also at an acute angle thereto in the direction of rotation of the inner chamber. Here again, the lengths of the slots are substantially coextensive with the effective length of the screen on the inner chamber.

A detailed description of the construction of the filter of the invention will now be given, in conjunction with a drawing, wherein:

FIGURE 1 illustrates a longitudinal or vertical section through a simplified version of the liquid filter of the invention. Some of the rods longitudinally positioned in the interior of the rotating inner cylinder or chamber have not been shown in the interest of simplicity of the illustration, so as not to detract from the clarity of the illustration;

FIGURE 2 is a sectional view of the filter of FIGURE 1 along the line 2—2;

FIGURE 3 is a detail illustrating in a simplified way the manner in which the screen of the interior rotating cylinder is mounted on the outside of and spaced from the longitudinally positioned spaced rods;

FIGURE 4 is a perspective view of the nozzle or liquid inlet connection used in the embodiment of FIGURE 1 and which is shown as a rectangle in dot-dash outline of FIGURE 1;

FIGURE 4a is a partial cross sectional view of the interior of the rotatable inner cylinder illustrating the action of the deflecting rods in providing a self-cleaning action for the filter of the invention, in only one of the many positions the rods occupy as the rotatable inner cylinder travels past the relatively closely spaced slot which supplies the incoming liquid under pressure;

FIGURE 5 is a modification of the liquid filter of FIGURE 1 and differs primarily from FIGURE 1 in showing (1) how the discharge pipe for carrying away the filtered liquid may exit through the side wall of the outer casing, (2) a window in the side wall of the outer casing for enabling a visual inspection of the inner screen carrying cylinder; and (3) a liquid deflector plate in the interior of the outer housing;

FIGURE 6 shows a cross-sectional view of another modification of the invention, in which the inner screen carrying cylinder is concentrically disposed within and spaced from an outer stationary housing or casing having a symmetrically irregular circular cross-section and which is provided with a multi-feed arrangement comprising a plurality of suitably spaced nozzles for introducing the liquid to be filtered through the side wall of the outer housing;

FIGURE 7 shows a cross-sectional view of still another modification of the invention in which the outer stationary housing or casing is in the form of a square in cross-section;

FIGURE 8 is a sectional view of FIGURE 5 along the line 8—8 to show details of the deflector plate construction and manner of mounting;

FIGURE 9 is a modification of the inlet construction of the filter of FIGURES 1 to 7 and shows how the elongated inlet slot may actually enter the space between the outer casing and the rotatable inner cylinder so that the slot can be very closely positioned adjacent to but spaced from the screen;

FIGURE 10 illustrates, in cross-section, another embodiment of the filter of the invention, wherein the inlet construction is in the form of a pair of elongated slots arranged at an acute angle to each other and each slot arranged at an acute angle to the surface of the screen on the rotatable inner chamber or cylinder;

FIGURE 11 is a view taken along line 11—11 of FIGURE 10 and shows one form of a liquid feeding arrangement to supply under pressure the incoming liquid to be filtered to the dual slot arrangement shown in FIGURE 10;

FIGURE 12 is a longitudinal or vertical section of still another embodiment of the filter of the invention. This embodiment also utilizes a dual slot inlet construction;

FIGURE 12a is a sectional view of the filter of FIGURE 12 taken along the line 12a—12a of FIGURE 12.

FIGURE 13 is a detail illustrating a modification of the dual slot inlet construction and shows how different inserts or longitudinal channel sections having different sizes of slots may be inserted into the tapered slot inlet arrangement for enabling desired narrow concentrated streams of the liquid to be filtered to impinge on the screen; and FIGURE 13a illustrates one form which an insert or longitudinal channel section may take for use in the construction of FIGURE 13.

Throughout the figures of the drawing, the same parts are designated by the same reference numerals while functionally equivalent parts are provided with prime designations.

The liquid filter of the invention shown in FIGURES 1, 2 and 5 comprises an outer stationary housing or casing 10 within which there is mounted an inner rotatable screen carrying chamber or cylinder 12, in turn, driven by a motor M through a gear box G and a shaft S. Rotation of the inner cylinder 12 is in the direction of the arrow shown.

The outer casing 10 comprises an outer wall 11 made from a liquid impermeable material, such as metal (such as stainless steel), glass or plastic, mounted between an upper cover plate 13 and a lower plate 15. Outer wall 11, as shown in FIGURE 1, may be a transparent plastic material to enable visual observation of the inner rotating cylinder 12, or, if desired, an opaque material provided with a window 29 as shown in FIGURE 5. A plurality of equally spaced outer metallic rods 17 firmly secure the outer wall 11 and the plates 13 and 15 together, as shown. The bottom plate 15 of FIGURE 1 is provided with an aperture 19 to enable the sediment which is deposited on the bottom plate in the interior of the outer casing 10 to be washed out through pipe 21 to a sewer or other disposal unit. The upper cover plate 13 is provided with an air vent 23 which, by means of manually operated valve 25, permits a reduction in air pressure in the interior of the outer casing shortly after the start of operation of the liquid filter of the invention.

The inner cylinder 12 is mounted on a stationary discharge pipe 14 or 14' by way of a suitable bearing 16, such as a nylon bearing. This discharge pipe 14 or 14' carries away the clean or filtered water in the direction of the arrows shown in this pipe. The inner cylinder 12 includes an upper flat cover plate 18 and a bottom plate 20 for supporting a wire coil 22 wound around and outside of a plurality of equally spaced longitudinally extending round rods 24. Although the rods 24 are shown in FIGURES 1, 2, 3 and 5 as being round in shape, they may be square in cross-section as shown in FIGURE 6. A woven mesh screen 26 is mounted on the outside of the coil 22 over the entire length of the rotating cylinder between the plates 18 and 20. An important aspect of the invention is that the coil 22 assures the presence of a space between the rods and the screen which is required to assure a deflection of the liquid impinging on the rods back toward the screen to assure a cleaning action on the screen, as shown in FIGURE 3 and illustrated more clearly in FIGURE 4a. In practice, the screen 26 is supported by a thicker screen positioned between 26 and the turns of coil 22 as illustrated in greater detail in FIGURES 4a, 9 and 10 and described hereinafter. This thicker inner screen is not shown in FIGURES 1, 3 and 5 in the interest of simplicity of illustration so as not to detract from the clarity of the drawings. A feature of the filter of FIGURE 1 and FIGURE 5 is the off-center or eccentric mounting of the inner rotatable cylinder 12 relative to the outer drum casing 10. It should be noted that the distance X between the inner cylinder 12 and the outer casing 10 at the location of the water inlet connection 28 communicating with the nozzle 30 is smaller than the spacing Y between these same cylinders at a diametrically opposite location. In practice, water inlet connection 28 is an elongated slot in the wall 11 of the outer casing 10.

The nozzle 30, shown in detail in FIGURE 4, comprises an elongated metallic construction which is attached to the stationary outer housing or casing 10 and surrounds a portion of the outer wall 11 of the casing 10 for enabling the liquid to be filtered to pass through a registering slot in the casing 10 and enter the interior or hollow chamber of the casing 10 under pressure. Where the outer casing is in the form of a cylinder or drum, as shown in FIGURES 1 and 5, the metallic construction of the nozzle 30 surrounds an arcuate portion of the outer wall 11. A pair of inlet pipes 23, 23 introduce water under pressure to the nozzle 30. The nozzle is provided with an elongated slot 27 which communicates and registers with the slot 28 of similar dimensions in the wall 11 of the outer casing. The lengths of slots 27 and 28 extend over a major portion of the length of the screen and preferably are substantially coextensive with the effective length of the screen mesh on the inner rotatable cylinder. The inlet slot 28 is so constructed as to permit the water to be filtered to enter the interior of the outer casing 10 and to strike the screen mesh of the inner rotating cylinder 12 at an acute angle in a direction opposite to the direction of rotation of the inner mesh cylinder. These inlet pipes 23, 23 are representative of any desired number of inlet pipes evenly spaced along the length of the nozzle to produce a uniform water flow through slot 27.

In the operation of the self-cleaning filter of the invention, the incoming water from the nozzle 30 impinges with force on the mesh screen of the inner rotating cylinder 12. The fine holes in the mesh 26 prevent dirt and debris from entering the interior of the rotating cylinder 12. Some of this incoming water passes through wire mesh or screen 26 and impinges on the rods 24 which are on the inside of and rotatable with the screen as a single unit as a result of which water is deflected outwardly and passes out through the mesh screen 26, thereby cleaning the holes in the mesh screen from dirt and debris before the water again passes through the mesh and enters into the interior of the rotating cylinder. There is thus a continuous automatic backwashing operation on the screen during operation of the filter. It should be noted that each rod occupies only a very small part of the circumference of the screen, and there are at least several spaced rods (six in the embodiment shown in FIG. 1) for each quadrant of the circumference of the screen in order to achieve as thorough a cleaning action as is possible. The dislodged dirt and debris falls to the bottom of the stationary outer casing where the sediment collects upon plate 15 and drains or passes out through hole 19 and pipe 21 as shown in FIGURE 1. There is thus achieved a continuing self-cleaning action from the inside out of the rotating cylinder which prevents clogging of the holes in the mesh screen. The filtered liquid which has entered the rotating inner cylinder through the mesh screen 26 is removed by pipe 14 in FIGURE 1 for utilization purposes.

FIGURE 4a illustrates broadly the manner in which the liquid to be filtered and supplied under pressure as a narrow stream from slot 27 of the nozzle has some of it deflected back through the screen after striking the deflecting rods 24 of the rapidly rotating inner cylinder. The liquid which is deflected by the rods 24 and returns through the screen 26 serves to automatically backwash and clean the screen of debris, pulp and undesirable solid matter which is to be filtered from the incoming liquid. The arrows indicate, by way of example only, the directions of impingement of the liquid on the rods 24 and of deflection back toward and through the screen 26. Some of the arrows indicate how the liquid also enters the interior of the inner chamber or cylinder. For other positions of the inner cylinder as it rotates toward the nozzle slot, the rods are highly effective to assure deflection of water at angles which cover the entire space between adjacent rods. The angle of incidence of the inflowing narrow stream of liquid from the elongated slot impinging upon the screen and deflecting rods may vary over a range of acute angles to the horizontal axis of the rotatable inner cylinder depending upon the diameter of the inner cylinder and need not be tangential to the outer surface of the screen. The position of the slot at an acute angle to the screen in effect reduces the cross section of the holes in the screen as seen by the particles to be filtered out of the incoming narrow stream. The concentrated narrow stream of liquid emerging from the slot acts as a knife to cut through any mat or accumulation of fibers tending to form particles on the screen. The deflected liquid from the rods 24 inhibit the tendency for undesired matter in the liquid from adhering to the screen. By trial and error, this acute angle is easily ascertainable to provide the most effective filtering action for the type of liquid or slurry to be filtered. The illustration of FIGURE 4a is not to be considered as limiting because the angles of deflection of the liquid impinging on the rods will vary with the shape of the rods, the speed of rotation of the inner cylinder, the spacing of the rods, and the angle which the concentrated narrow stream of liquid emerging from the inlet slot makes with the screen. This figure shows the use of another screen 26' which is thicker than and has larger holes than screen 26 for supporting screen 26 on the assemblage and preventing collapse of the thinner screen 26 under the pressure of the incoming liquid from slot 27.

In one embodiment of the invention built in accordance with FIGURE 1 and used successfully, the mesh screen 26 had 100 holes per linear inch or 10,000 holes per square inch—open area of mesh about 36%—and delivered a clean filtered output at the rate of 43 gallons per minute at a motor speed of approximately 44 r.p.m.— equivalent to a speed of about 90 linear feet of mesh screen per minute. Similar results were obtained with a screen having 200 holes per linear inch. The sediment or fiber particles filtered from the incoming liquid flowed out at a rate of about 2 gallons per minute. The pressure of the incoming water from nozzle 30 was over a range of 20 pounds to 31 pounds. The slots 27 and 28 were about 1/8" wide. The inner rotating cylinder was about 8" long and had a 6½" outer diameter and about a 5¾" inner diameter considering an imaginary circle around the inside surfaces of the rods. There were about 25 relatively rigid rods 24, each ¼" in diameter, and the rods were equally spaced on ¾" centers around the interior circumference of the mesh screen. Thus, for each quadrant of the circle there were about 6 rods with an open spacing of about ½" between adjacent rods. Stated another way, the spacing between adjacent rods is greater than the diameter of a rod. The distance between the centers of each pair of rods in this embodiment subtends an arc or angle of approximately 15° on the mesh screen. The outer casing 10 had an inner diameter of about 7½" and a length of about 18". The spacing X was about ¼", while the spacing Y was about ¾". The liquid flowing through the slots emerged as a narrow stream under pressure and at an appreciable velocity, impinging on the screen and deflecting rods. It should be apparent that the physical size of the filter may vary, depending upon the desired capacity of the filter and that the size of the holes in the screen and the number and cross-sectional area of the rods 24 may also vary. Thus, the screen can be a 400 mesh or any other desired size, the rods may be 3/16" thick and provide an open spacing of 7/16" between the adjacent rods, by way of example only. The speed of the motor driving the inner cylinder will depend upon the load.

In one way of fabricating the filter of the invention, holes are drilled into the end plates 18 and 20 to accommodate the ends of the liquid deflecting rods 24. After the ends of these rods 24 are inserted into these holes in the end plates they are welded fast to the end plates. Grooves 1/32 inch are then placed in the rods on ¼ inch centers on the outer surfaces of the rods to support the helically wound turns of the wire 22. The helical wire 22 may be 1/16 inch diameter which fits only one-half way into the grooves in the deflecting rods. On top of the helical coil 22 and around it there is tightly wrapped a woven screen 26' which may be 10 mesh (i.e., 100 holes per square inch). The helically wound coil 22 assures that there is a desirable spacing between the liquid deflecting rods 24 and the screen. The abutting edges of the screen 26' are then welded together. Thus the rods 24, the plates 18, 20, the screen 26 and the helical wire 22 rotate as a single integrally joined unit. The screen 26' may be about 1/32 inch thick and forms the support for the much thinner mesh screen 26 which is tightly wrapped around the screen 26'. For example, the thinner mesh screen 26 may be .0015 inch thick and be 250 mesh size (250×250= 62,500 holes per square inch). The abutting edges of the thin screen 26 are welded or soldered together. Although the screens may be made of bronze or copper, stainless steel is preferred, particularly so if the filter is to be used in the paper industry because of the acidity of the liquid to be filtered. It should be understood that the outer screen 26 may be replaced by other sizes (of course, finer than and thinner than screen 26') depending upon the size and nature of the particles in the liquid to be filtered and the use in which the filter is put. The outer mesh screen 26 is made slightly larger than the length between the end plates 18 and 20 and the end portions of screen 26 folded over the end plates 18 and 20 and tightly clamped to the end plates by other plates, as shown in FIGURE 12. Rubber gaskets are placed between the adjacent plates which clamp the end portions of the screen 26 in order to provide liquid tight seals which prevent liquid from entering the inner rotatable cylinder through the folded-over end portions. The inner thicker 10 mesh screen 26' acts to support the thinner 200–250 mesh screen 26 against the pressure of the incoming liquid and thus prevent destruction of the outer screen 26.

The two screens 26 and 26' are of the type known in the industry as flat weave wherein round wires are used with one wire going over and then under the next wire in the manner of a weave.

The details of this method of fabrication are not shown in some of the figures of the drawing in the interest of simplicity of illustration of these figures, but many of these details are shown in FIGURES 4a and 12.

The modifications of FIGURES 5, 6 and 7 show only enough structure necessary for an understanding thereof in the interest of simplicity of illustration. Thus, FIGURE 5 is similar to the filter of FIGURE 1 except for passage of discharge pipe 14' through the side wall of outer casing 10, the use of a funnel-shaped bottom for the outer casing to carry away the sediment over a pipe 31, and the provision of a clear glass window 29 in one area of the wall of the outer casing. A feature shown in FIGURE 5 which is not shown in FIGURE 1 is a deflecting plate 33 in the interior of the outer casing and positioned below the inner cylinder for deflecting debris, dirt or other particles such as fibers which are washed down from the screen, into the funnel 15'. The operation of the filter of FIGURE 5 is similar to that of FIGURE 1.

FIGURE 6 is a modification of the filter of the invention and shows only those essential features which differ from the filters of FIGURES 1 and 5, it being understood that the other details, such as the drive means, the bearing, the discharge pipes, etc., may be the same as those illustrated in FIGURES 1, 3, 4 and 5. The inner rotatable screen carrying cylinder or chamber 12' of FIGURE 6 is concentrically disposed within and spaced from the stationary outer housing or casing which, in cross-section, is in the form of a symmetrically irregular circular wall provided with bulging wall portions 9 symmetrically positioned between other wall portions which are closer to the inner cylinder. A multi-feed construction comprises a plurality of nozzles 30 (shown in cross-section) similar in construction to the nozzle 30 of FIGURES 1, 4 and 5 for introducing under pressure the liquid to be filtered at the more closely spaced regions between the inner cylinder and outer casing. Here again, as in FIGURES 1 and 5, the direction of rotation of the inner cylinder is opposite to the direction of flow of the fluid as it passes from the slots in the nozzles through the registering slots in the side wall of the outer casing. The widening spaces produced by the bulges 9 produce a venturi-effect adjacent each nozzle to draw or suck the debris away from the screen and narrow spaces between inner cylinder and outer casing. Each nozzle has a slot of a length substantially coextensive with the length of the screen on the inner cylinder, and this is also true of the registering slot in the side wall of the outer casing. The pressure exerted on the fluid in all of the slots should preferably be the same. A feature of FIGURE 6 is the square shape of the liquid deflecting rods 24' in the interior of the inner cylinder. These rods have flat or planar surfaces oriented to provide maximum deflection in a direction toward the screen for the liquid impinging thereon. Whether the rods are circular as shown in FIGURES 1 and 5 or have flat surfaces as shown in FIGURE 6, they are deemed to be substantially round because they are of substantially uniform cross-section. The direction of rotation of the inner cylinder is shown by the arcuate arrows in the interior of the cylinder while the directions of the flow of the fluid to be filtered in the nozzles are shown by the arrows in the nozzles. The multi-feed construction of FIGURE 6 increases the capacity of the filter over and above a single feed nozzle for the same physical size of filter construction.

FIGURE 7 shows a construction of a filter which is somewhat similar to that of FIGURE 6, except that the stationary outer casing is square in cross-section. FIGURE 7 is also provided with a multi-feed construction in the form of a plurality of symmetrically positioned nozzles of slot form as shown in FIGURE 6. In the interest of simplicity of illustration, the nozzles and the details of construction of the inner rotatable cylinder have not been shown, it being understood that such details are illustrated in FIGURE 6. The direction of rotation of the inner cylinder and the directions of fluid inlet flow are shown by arrows in FIGURE 7. Each flat surface of the outer casing of FIGURE 7 is provided with a slot, as shown, the length of which is substantially the same as the length of the screen on the inner cylinder, and each slot in the outer casing registers with a slot in a nozzle. It should be noted that the fluid inlet connections in FIGURE 7 are at locations where the inner cylinder is close to the outer casing, in a manner similar to the showing in FIGURE 6.

Deflector plate 33 is flat and rectangular and is shown only in cross-section in FIGURE 5. A view looking down on the elbow and plate 33 along the line 8—8 of FIGURE 5 is shown in FIGURE 8. Plate 33 is arranged at an acute angle to the longitudinal axis of said inner cylinder and is fastened by welding at one upper corner 35 to the elbow 34 of the discharge pipe 14'. The diametrically opposite corner 37 (a lower corner) of plate 33 contacts and rests against a point on the circular wall of the outer casing 10' just above the top of the funnel 15'. The width of the flat deflector plate 33 is about one-half of the arc which it tends to subtend on the interior surface of the circular wall of the outer casing. The other pair of diametrically opposite corners 39 and 41 of the rectangular plate 33 do not engage any parts of the elbow or the outer casing 10' and thus permit the free flow of liquid past these corners. Deflector 33 thereby serves to turn or deflect into the funnel 15' the liquid which contains the debris, dirt or sludge without danger of debris accumulation or obstruction at the location of contact between the lower corner 37 of the plate 33 and the wall of the outer casing 10'. The liquid in the lower part of the outer casing 10' is agitated by the revolving inner cylinder and moves in a circuitous path around the interior of the outer casing 10'. It will be apparent that other shapes can be used for deflector 33, such as an oval configuration.

The embodiment of FIGURE 9 differs primarily from those of FIGURES 1 to 7 in the positioning of the elongated slot in the space between the outer casing 11 and the screen 26. The slot designated 27' is arranged at an acute angle to the screen and has a length substantially coextensive with the entire effective length of screens 26 and 26'. The slot 27' is fitted with brass or bronze sections 50 located inside the outer casing 11 to permit a very close spacing between the end of the slot 27' within the casing and the screen. Here again, the rotatable chamber is off-centered relative to the outer casing 11, though it may, if desired, be concentrically arranged. In the latter case, the slot 27' will, of course, be as close to the inner chamber as indicated. Rotation of the inner chamber is preferably in a direction against the flow of incoming liquid.

FIGURE 10 shows an improved filter with a dual slot inlet construction in which two slots 51 and 52 are arranged at an acute angle relative to each other and each slot at an acute angle to and adjacent the surface of the screen. By way of example, slots 51 and 52 may make an angle of 60° to 65° to one another, and each slot makes an angle of 30° to 35° relative to the longitudinal axis of the inner cylinder. Both slots 51 and 52 are coextensive with the effective lengths of the screens and are tapered with the widest portions W positioned nearest the feed distribution manifold or tube 53 which supplies the liquid under pressure to both slots. The narrowest portions of the pair of slots are closest to the screen and equally spaced therefrom. Because of the foregoing acute angle relationship of the slots to each other and to the screen, a very effective cleaning action occurs regardless of the direction of rotation of the inner cylinder. One slot will always direct the liquid in a direction against the direction of rotation of the inner cylinder while the other slot will always direct the liquid in the direction of rotation of the inner cylinder. Thus, because of the weave construction of the screens, the inflowing liquid from the two slots wash the wires of the screens in opposite directions. It is preferred in this embodiment that the filter be arranged horizontally rather than vertically. The solid particles which are filtered will flow down both sides of the rotating inner chamber and be discharged or collected from the bottom thereof in a manner, for example, shown in more detail in FIGURES 12 and 12a. The larger spacing at the bottom of the filter between outer casing 11 and the inner chamber, due to the off-centered arrangement, permits easy collection of the sediment or filtered-out solid particles. The clean liquid in the interior of the rotating inner chamber may be discharged in any suitable manner, as for example, as shown in FIGURES 12 and 12a. The distribution manifold 53 may comprise a tube or box 53 closed at one end 54 and fed from two inlet pipes 55, 55 as shown in FIGURE 11.

The embodiment of FIGURES 12 and 12a is also designed for use preferably in the horizontal position and also, like the filter of FIGURE 10, makes use of the dual slot inlet construction wherein both slots extending over the length of the screen are positioned at an acute angle to each other and each at an acute angle to the screen surface. A funnel-shaped outlet 56 receives the filtered-out solid particles which pass through a discharge pipe 78. A baffle or partition 57 separates the filtered-out solid particles flowing down both sides of the screen, at the location nearest the bottom of the screen, to prevent undesired interaction between the two flows of the filtered particles and permits collection of both flows by the funnel 56 as shown clearly in FIGURE 12a. The distribution manifold 53 is closed at both ends and fed with the incoming liquid under pressure from three feed pipes 55, 55, 55. The end portions of the outer screen 26 are shown folded over the end plates 18' and 20' and clamped thereto by annular plates 59. A rubber liquid sealing gasket 58 is positioned between the end plates and the clamping plates 59.

The rotatable inner cylinder is provided with a hollow centrally positioned tube 60 which is provided with relatively large apertures 61 spaced along the length of the tube for permitting the clear filtered liquid to enter the tube and be drawn out from the left side in the direction of the arrow. Tube 60 is held in position in the interior of the inner cylinder by spaced discs 62 each provided with a plurality of apertures 63 to permit the flow of liquid therethrough. The outer peripheral edge of each disc 62 is notched at spaced locations corresponding to the locations of the liquid deflecting rods 24. Rods 24 fit into the notches on the discs 62. The axially positioned short rod 64 is to enable easy assembling and disassembling of the rotatable inner chamber. A bearing bracket 65 is attached to an outside end plate 66 for supporting a ball bearing arrangement 67. A suitable mechanical seal 68 is provided with the conventional porcelain ring, carbon ring, spiral spring and rubber sections. L-shaped flanges 70 and 71 are provided between both outside end plates 66 and 69 and the main portions of the filter, as shown. A key 72 may be provided for a pulley drive for the rotatable inner cylinder. In the operation of the filter of FIGURES 12 and 12a, a vacuum is created in the inner hollow tube 60 which draws out the clear liquid at the left in the direction of the arrow. This is due, it is believed, because of the differential pressure between the inlet and clear liquid outlet. The pressure at the clear liquid outlet is less than the pressure at the inlet because of the tendency of the debris or particles to seal portions of the screen before the debris or particles are washed away.

The filter of FIGURES 12 and 12a is designed for a 120 gallon per minute take out of clean filtered liquid, using a 250 mesh for screen 26 with a speed of rotation for the inner cylinder of 90 revolutions per minute. The debris discharge may be about 2 gallons per minute. By way of example, the inner cylinder may be 24 inches long and a 7¼ inch outside diameter, using 26 liquid deflector rods or bars 24 each ⅜ inch diameter. It should be noted that the arrangement of liquid deflector bars 24 and the surrounding screen in the embodiments of FIGS. 9, 10, 12 and 12a is designed to be similar to the arrangement of the same elements in the embodiments of FIGS. 1, 5 and 6.

In the operation of the filter of the invention, caution should be observed that the opening of the debris discharge outlet should not be reduced to a size where the debris or solid particles cannot flow out freely. If the debris outlet is too small, then the debris will build up to a point where it will clog the openings in the screen.

FIGURE 13 is a modification of the dual inlet slot construction of the embodiments of FIGURES 10 and 12 and shows a removable inlet distribution manifold 53′ for permitting longitudinal section slot inserts 73 to be placed within tapered slot openings 51′ and 52′. By means of this feature, inserts having slots of different dimensions may be used.

An advantageous characteristic of the present invention is the simplicity of construction which readily enables the removal of the outer housing for cleaning or other purposes and the disassembling of the other parts of the filter.

The term "screen" used herein in the specification and claims is deemed to include a filter medium made of any suitable material either in mesh or woven form.

What is claimed is:

1. Filtering apparatus for removing solid particles from a liquid, comprising a stationary casing containing therein an inner rotatable chamber, said inner chamber having a screen as a side wall, a plurality of longitudinally arranged and spaced rods in the interior of said screen positioned in a circle around and near the peripheral surface of said screen, said rods being parallel to each other and to the screen axis, there being at least several spaced rods for each quadrant of the peripheral surface of the screen with the spacing between the adjacent rods at least equal to the diameter of a rod, and means including a feed inlet positioned in closely spaced relationship to the screen surface for introducing the liquid to be filtered under pressure through an opening in the side wall of said casing for impingement as a concentrated stream against the outer surface of said screen during the operation of said apparatus, said rods being spaced from one another and from the screen and arranged to deflect the liquid passing through said screen and impinging thereon back towards said screen to maintain said screen substantially free of said solid particles, said inlet being a slot having a length which extends over a major portion of the effective length of said screen, the distance between said slot and said screen at the region of said slot being substantially smaller than the distance between said screen and the outer casing at other regions devoid of slots.

2. Filtering apparatus according to claim 1, wherein said slot is arranged to cause the liquid flowing therethrough to impinge as a narrow stream on said screen at an acute angle relative to the screen.

3. Filtering apparatus according to claim 1, wherein said slot is arranged to cause the liquid flowing therethrough to impinge as a narrow stream on said screen at an acute angle to the screen, said inner rotatable chamber being mounted off-center with respect to said stationary casing.

4. Filtering apparatus according to claim 1, including means for rotating said inner chamber in a direction opposite to the direction in which the introduced liquid flows in impinging on said screen.

5. Filtering apparatus for removing solid particles from a liquid, comprising an outer stationary casing containing therein an inner rotatable chamber, said chamber comprising a screen as a side wall and a plurality of longitudinally arranged and spaced liquid deflecting rods in the interior of said screen positioned in a circle and near the peripheral surface of said screen, said rods being spaced from one another and spaced from the screen axis and from the screen, said inner rotatable chamber being closed at one end by a cover plate and at the other end by another plate, a shaft coupled to said cover plate and entering through said outer casing for driving said inner chamber, said plate at the other end having an opening therein communicating with a stationary discharge passage, and a bearing between said plate at the other end and said stationary discharge passage for enabling said chamber to be rotatably mounted on said discharge pipe, and means including a slot positioned in closely spaced relationship to the screen surface for introducing under pressure the liquid to be filtered as a narrow stream through an opening in the side wall of said casing for impingement against the outer surface of said screen, the distance between said slot and screen being smaller than the distance from said screen to the outer casing at other locations devoid of slots.

6. Filtering apparatus for removing particles from a liquid, comprising a rotatable hollow cylinder having a screen as a side wall, a stationary casing surrounding said cylinder, a plurality of longitudinally arranged and spaced liquid deflecting rods in the interior of said screen positioned in a circle and near the peripheral surface of said screen, said rods being spaced from one another and from the screen axis and from the screen and arranged to deflect the liquid passing through said screen and impinging thereon back towards said screen, there being a plurality of said rods for each quadrant of the peripheral surface of said cylinder, and multi-feed inlet means for introducing the liquid to be filtered under pressure through the side wall of said casing for impingment against said screen, said multi-feed means comprising a plurality of spaced elongated slots each having wall surfaces providing a relatively narrow passage for the flow of liquid therethrough, and each extending over a major portion of the effective length of said screen and positioned in closely spaced relationship to the screen surface, the distance between the ends of said slots which are nearest said screen and said screen being substantially smaller than the distance from said screen to the outer casing at other locations removed from said slots.

7. Filtering apparatus in accordance with claim 6, wherein said plurality of slots comprise a pair of slots arranged at an acute angle to each other and each at an acute angle to the surface of the screen.

8. Filtering apparatus in accordance with claim 6, wherein said slots are uniformly positioned over the outer peripheral surface of said screen.

9. Filtering apparatus in accordance with claim 6, wherein said casing and rotatable cylinder are arranged in a horizontal position and said slots are positioned above said rotatable cylinder, said plurality of slots comprising a pair of slots arranged at an acute angle to each other and each at an acute angle to the surface of the screen such that one slot of said pair is adapted to project a narrow stream of liquid against said screen in the direction of rotation of said rotatable cylinder while the other slot of said pair is adapted to project a narrow stream of liquid against said screen in a direction opposite to the direction of rotation of said rotatable cylinder.

10. Filtering apparatus in accordance with claim 6, wherein said casing and rotatable cylinder are arranged in a horizontal position and said slots are positioned above said rotatable cylinder, said plurality of slots comprising a pair of slots arranged at an acute angle to each other and each at an acute angle to the surface of the screen such that one slot of said pair is adapted to project a narrow stream of liquid against said screen in the direction of rotation of said rotatable cylinder while the other slot of said pair is adapted to project a narrow stream of liquid against said screen in a direction opposite to the direction of rotation of said rotatable cylinder, a discharge path for said particles located at the bottom of said casing, and a vertically arranged baffle dividing said path into two parts, said path communicating with a particle discharge outlet.

11. Filtering apparatus in accordance with claim 6, wherein said casing and rotatable cylinder are arranged in a horizontal position and said slots are positioned above said rotatable cylinder, said plurality of slots comprising a pair of slots arranged at an acute angle to each other and each at an acute angle to the surface of the screen such that one slot of said pair is adapted to project a narrow stream of liquid against said screen in the direction of rotation of said rotatable cylinder while the other slot of said pair is adapted to project a narrow stream of liquid against said screen in a direction opposite to the direction of rotation of said rotatable cylinder, a discharge path for said particles located at the bottom of said casing, and a filtered-liquid discharge tube positioned in a horizontal position within and along the length of the rotatable cylinder and extending out from one end of said cylinder and the adjacent end of said stationary casing, said discharge tube having spaced holes along the length thereof within said rotatable cylinder, whereby there is liquid flow communication between the hollow cylinder and the interior of said tube.

12. Filtering apparatus in accordance with claim 6, wherein said casing and rotatable cylinder are arranged in a horizontal position and said slots are positioned above said rotatable cylinder, said plurality of slots comprising a pair of slots arranged at an acute angle to each other and each at an acute angle to the surface of the screen such that one slot of said pair is adapted to project a narrow stream of liquid against said screen in the direction of rotation of said rotatable cylinder while the other slot of said pair is adapted to project a narrow stream of liquid against said screen in a direction opposite to the direction of rotation of said rotatable cylinder, a discharge path for said particles located at the bottom of said casing, and a filtered-liquid discharge tube horizontally positioned within and along the length of the rotatable cylinder and extending out from one end of said cylinder and the adjacent end of said stationary casing, said discharge tube having spaced holes along the length thereof within said rotatable cylinder, whereby there is liquid flow communication between the hollow cylinder and the interior of said tube, spaced apertured disks supporting said tube from the wall of said hollow cylinder, a funnel-shaped discharge outlet located at the bottom of said casing, and a plate-like baffle in a vertical position below said rotatable cylinder and within said funnel-shaped discharge outlet at a location near the bottom of said casing to prevent undesired interaction between the two flows of filtered particles on both sides of the rotatable cylinder.

13. Filtering apparatus according to claim 6 in which each elongated slot is a straight line slot parallel to the longitudinal axis of said rotatable cylinder and substantially coextensive with the effective length of said screen.

14. Liquid filter apparatus having an outer casing and an inner rotatable chamber provided with a screen as a side wall thereof, an inlet for introducing under pressure the liquid to be filtered for impingement as a concentrated stream against the outer surface of said screen, said inlet including a slot positioned in closely spaced relationship to the outer screen surface and having a length extending over the major portion of the effective length of said screen, the distance between said slot and screen being smaller than the distance between said screen and outer casing at locations removed from the region of said slot, said slot having an interior wall defining a relatively narrow passageway through which the incoming fluid under pressure flows, and making an angle to the longitudinal axis of said inner rotatable chamber, and screen cleaning means in the interior of said inner rotatable chamber for directing a backflow of liquid outwardly toward said screen for cleansing said screen of particles which may tend to adhere to the outer surface of said screen 15. Liquid filter apparatus according to claim 14 wherein said slot makes an acute angle to the longitudinal axis of said chamber, said outer casing and said inner rotatable chamber are horizontally arranged, and said screen cleaning means is positioned close to the screen and provides a continuous backflow of liquid through the screen.

16. Filtering apparatus for removing particles from a liquid, comprising an outer casing containing therein an inner rotatable cylindrical chamber, said inner chamber having a screen as a side wall, a plurality of uniformly spaced liquid deflecting rods longitudinally arranged in a circle in the interior of said screen, said rods being parallel to each other and to the screen axis, there being at least several said rods for each quadrant of the peripheral surface of said cylindrical chamber, said rods being positioned around and near but physically spaced from the peripheral surface of the screen and rotatable with said screen as a single unit, and feed inlet means including an elongated opening in the side wall of said casing for introducing under pressure the liquid to be filtered for impingement as a concentrated stream against the outer surface of said screen, said feed inlet means being positioned in closely spaced relationship to said screen surface and directing said liquid against said screen at a location where the distance therebetween is substantially less than the distance between said screen and outer casing at other locations devoid of elongated openings, said rods being arranged to deflect some of the liquid impinging thereon after passing through said screen back towards said screen to maintain said screen substantially free of said particles, and means for rotating said chamber at a velocity so related to the pressure of the liquid in the elongated feed inlet that the inlet liquid impinges as a concentrated stream against the outer surface of the screen and enters the screen to impinge on said rods during rotation of said chamber.

References Cited

UNITED STATES PATENTS

| | | | |
|---|---|---|---|
| 2,076,935 | 4/1937 | Burckhalter | 210—499 X |
| 2,614,696 | 10/1952 | Crane | 210—391 |
| 2,939,583 | 6/1960 | Hett | 210—304 X |
| 3,152,078 | 10/1964 | Lavanchy | 210—304 X |
| 3,241,675 | 3/1966 | Pashaian et al. | 210—360 |
| 3,241,676 | 3/1966 | Neuville et al. | 210—77 |
| 3,262,573 | 7/1966 | Schutte | 210—380 |

REUBEN FRIEDMAN, Primary Examiner.

J. L. DE CESARE, Assistant Examiner.